United States Patent [19]

Mercer

[11] 4,219,728
[45] Aug. 26, 1980

[54] HEATER MODULE FOR AN APPARATUS FOR MELTING AND DISPENSING THERMOPLASTIC MATERIAL

[76] Inventor: Donald R. Mercer, 110 Taylor Industrial Dr., Hendersonville, Tenn. 37075

[21] Appl. No.: 946,412

[22] Filed: Sep. 27, 1978

[51] Int. Cl.² .................................................. F27B 14/00
[52] U.S. Cl. ..................................... 219/421; 118/202; 219/521; 219/523; 219/530; 219/540; 222/146 HE
[58] Field of Search ............... 219/420, 421, 521, 523, 219/530, 540; 118/202, 410; 222/146 R, 146 HE, 385, 395, 397; 417/900; 418/181, 206, 270; 419/181

[56] References Cited

U.S. PATENT DOCUMENTS

| | | | |
|---|---|---|---|
| 2,809,772 | 10/1957 | Weisz | 118/202 X |
| 3,217,793 | 11/1965 | Coe | 219/540 X |
| 3,352,279 | 11/1967 | Lockwood | 219/421 X |
| 3,377,466 | 4/1968 | Paulsen | 219/421 |
| 3,396,458 | 8/1968 | Meng et al. | 219/540 X |
| 3,531,023 | 9/1970 | Mercer | 222/146 HE |
| 3,632,987 | 1/1972 | Orr | 219/530 |
| 3,792,801 | 2/1974 | Baker et al. | 222/146 HE |
| 3,964,645 | 6/1976 | Scholl | 222/146 HE |
| 4,009,974 | 3/1977 | Scholl | 418/181 |

Primary Examiner—Volodymyr Y. Mayewsky
Attorney, Agent, or Firm—Harrington A. Lackey

[57] ABSTRACT

A heater module adapted to be used in an apparatus for melting and dispensing thermoplastic material, with other like modules for forming a pre-melt and/or a melting stage for heating the thermoplastic material. Each module is of uniform construction and includes an elongated core having a plurality of longitudinally spaced first fins projecting from one side of the core and second fins projecting from the other side of the core, but longitudinally and uniformly staggered from the first fins, so that a plurality of parallel modules adjacent to each other will have the recesses between adjacent fins closed by the opposite fins to form longitudinally staggered vertical holes for the fluid passage of the melted thermoplastic material.

6 Claims, 6 Drawing Figures

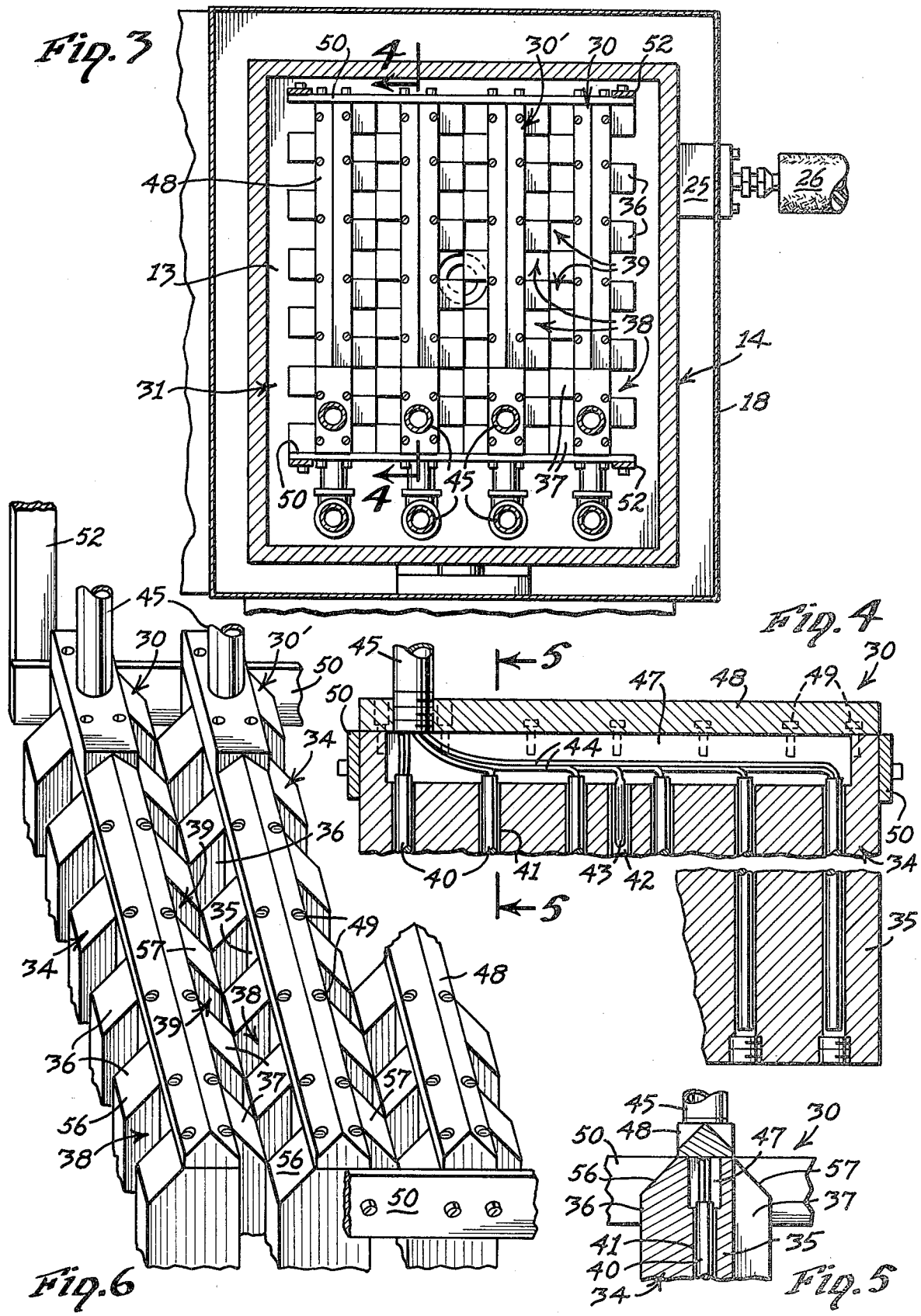

HEATER MODULE FOR AN APPARATUS FOR MELTING AND DISPENSING THERMOPLASTIC MATERIAL

BACKGROUND OF THE INVENTION

This invention relates to apparatus for the melting and dispensing of thermoplastic material, and more particularly to a heater module structure for such apparatus.

Apparatus for melting and dispensing thermoplastic material are known in the art, as evidenced by the following U.S. patents:

2,809,772 Weisz; Oct. 15, 1957
3,377,466 Paulsen; Apr. 9, 1968
3,531,023 Mercer; Sept. 29, 1970
4,009,974 Scholl; Mar. 1, 1977

However, none of the above patents disclose melting receptacles, chambers or grids assembled from a plurality of heater modules, much less the specific heater module structure contemplated by this invention.

SUMMARY OF THE INVENTION

It is therefore an object of this invention to provide a plurality of uniform heater modules adapted to be arranged side-by-side to form a heating grid assembly for an entire stage in an apparatus for melting and dispensing thermoplastic material. The heater modules may also be arranged in a plurality of vertical stages, with appropriate heating elements and heat sensing elements to provide progressive melting of the thermoplastic material.

More specifically, each heater module made in accordance with this invention includes an elongated body made of thermally conductive material, including an elongated core having longitudinally spaced first fins projecting from one side of said core and longitudinally spaced second fins projecting from the opposite side of said core, the second fins being longitudinally staggered relative to the first fins. Thus, when a second module is laid longitudinally parallel to and adjacent a first module, each first fin of the second module spans the corresponding space between each adjacent pair of second fins of the first module to close all vertical spaces between the adjacent first and second fins and to provide longitudinally staggered vertical holes for the fluid passage of the melted thermoplastic material.

By placing a plurality of the above heater modules side-by-side, an entire grid surface may be built up to form a complete heating stage for rapidly melting the thermoplastic material.

Furthermore, where progressive stages are desired, such as in the above recited Mercer U.S. Pat. No. 3,531,023, an assembly of the above heater modules may be utilized in each stage of the melting apparatus by mounting each assembled stage within a hoppertype housing having a cross-section of the same shape as, but slightly larger than, the cross-section of the assembled stages.

Conventional thermoplastic dispensing elements, such as dispensing head and hose, may be incorporated below the various stages assembled from the heater modules, for dispensing the melted thermoplastic material.

By the use of the heater modules made in accordance with this invention, various sizes of heating or grid stages may be constructed, with one or more vertically arranged stages, with a minimum of assembly time and materials.

BRIEF DESCRIPTION OF THE DRAWINGS

FIG. 3 is a section taken along the line 3—3 of FIG. 1;

FIG. 4 is an enlarged fragmentary section taken along the line 4—4 of FIG. 3;

FIG. 5 is a fragmentary section taken along the line 5—5 of FIG. 4; and

FIG. 6 is a fragmentary top perspective view of a plurality of heater modules assembled in a pre-melting stage.

DESCRIPTION OF THE PREFERRED EMBODIMENTS

Figure 1:
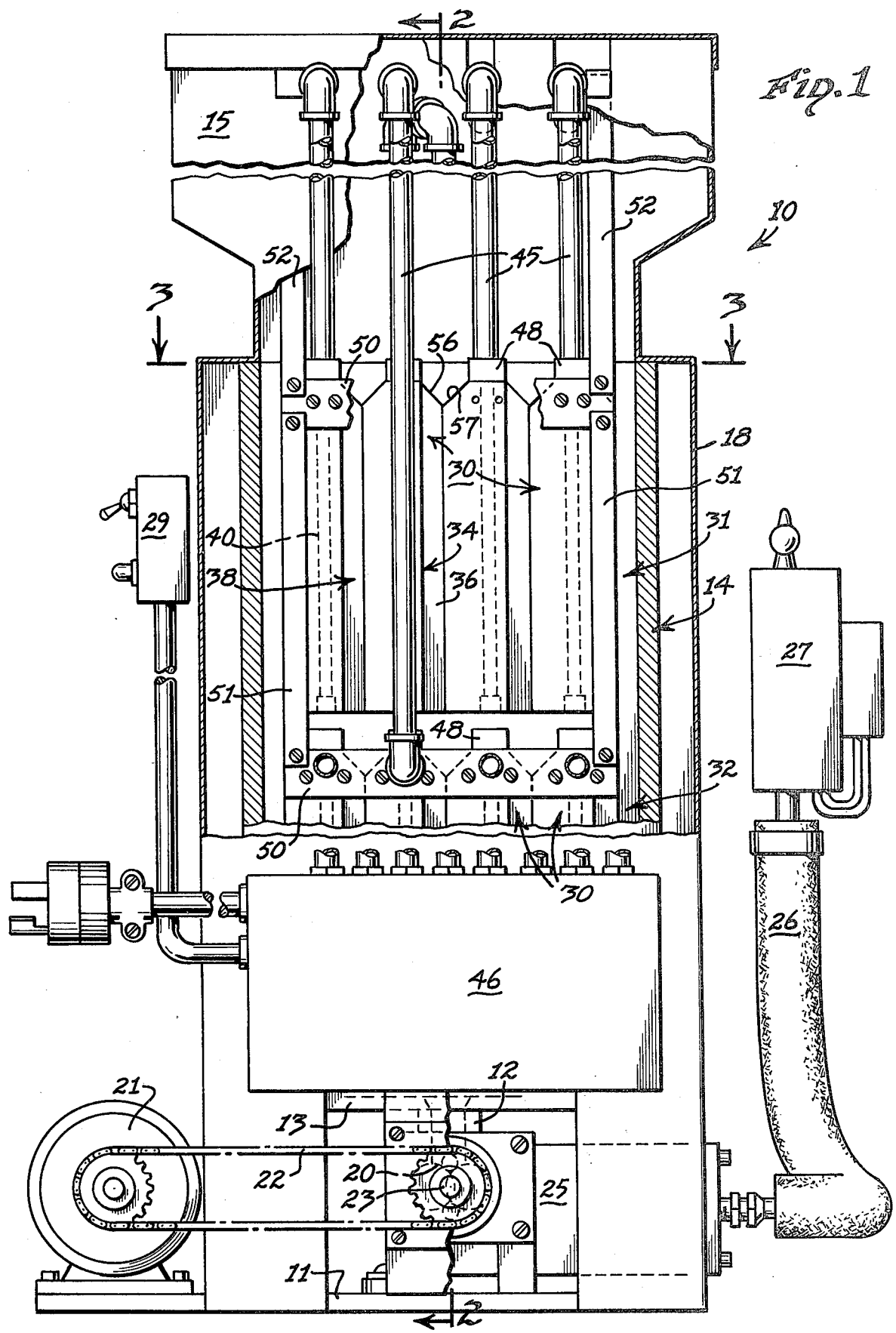
FIG. 1 is a front elevation of an apparatus for melting and dispensing thermoplastic material, incorporating the heater modules made in accordance with this invention, and with parts broken away and shown in sections.
Figure 2:
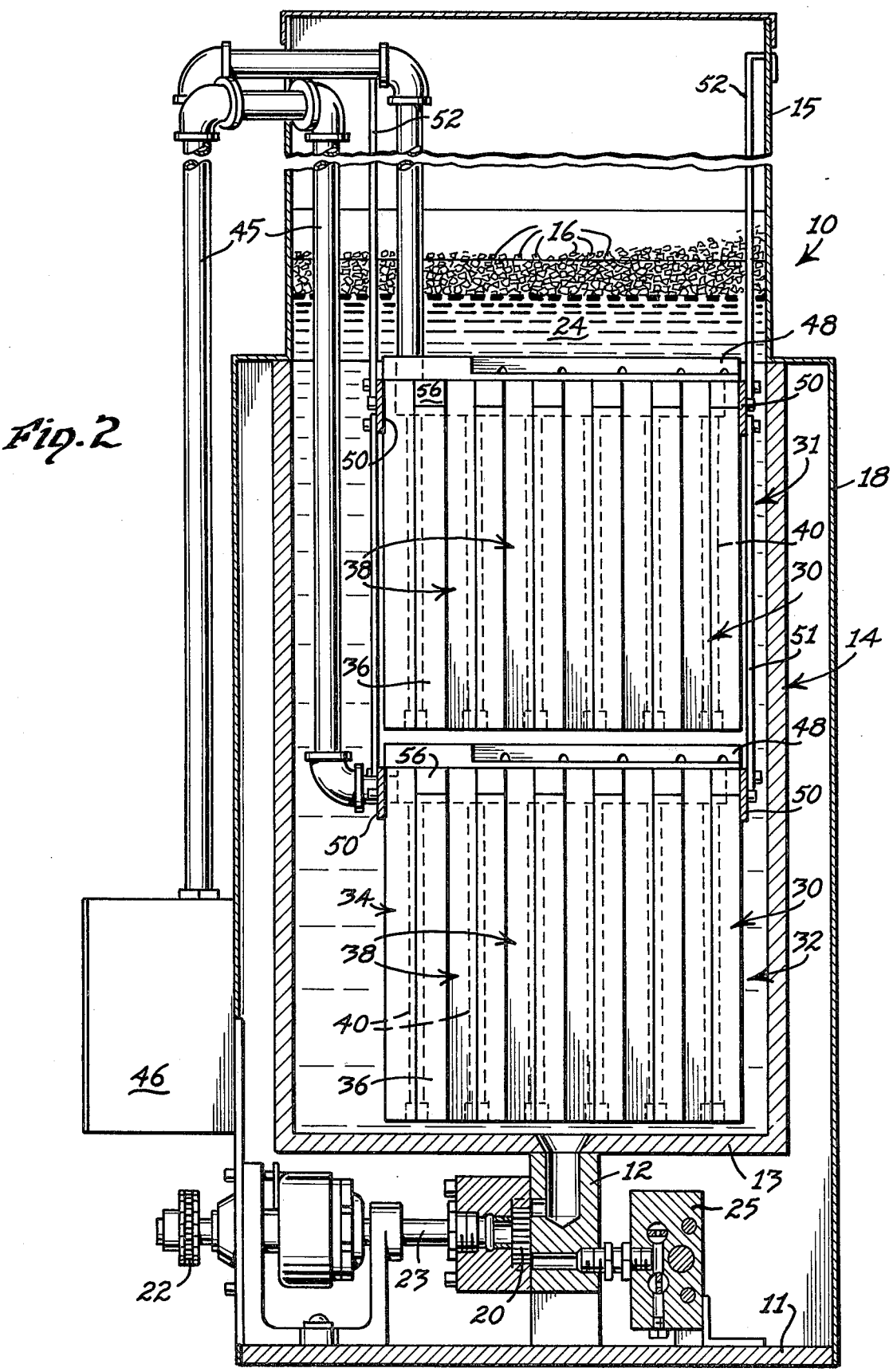
FIG. 2 is a section taken along the line 2—2 of FIG. 1.

Referring now to the drawings in more detail, the apparatus for melting and dispensing thermoplastic material, or "hot melt applicator," 10 has a base or base plate 11 upon which is supported a conduit block 12 in fluid communication with the bottom wall 13 of a hopper-type housing or heater receptacle 14.

Mounted on top of the heater receptacle 14, or forming a vertical extension of the walls thereof, is a hopper 15 for receiving the thermoplastic material 16 in its solid form. A protective casing or jacket 18 may enclose, and be spaced from the outer surface of the heating receptacle. As shown, the hopper 15 is integral with the jacket 18.

A gear pump 20 is driven by motor 21 through sprocketchain transmission 22 and driven shaft 23 to move the molten thermoplastic material 24 through the conduit block 12 into the heated dispensing head 25. Hose 26 conveys the hot thermoplastic material 24 from the despensing head 25, preferably through a nozzle 27, to a point of discharge.

The controls for the apparatus 10 are mounted in the control housing 29 on the outside of the jacket 18.

A plurality of heater modules 30, made in accordance with this invention, are assembled within the heating receptacle 14 to provide an upper, or pre-melt, stage 31 and a lower, melting, or progressive melting stage 32.

Each module 30 includes an elongated body 34 of thermally conductive material. Each enlongated body 34 includes an elongated substantially rectangular core 35 of substantial height or depth having a plurality of first and second fins 36 and 37 projecting from opposite sides of the core 35. Each of the first and second fins 36 and 37 is a substantially uniform, rectangular cross-section. Moreover, the first fins 36 and the second fins 37 are uniformly longitudinally spaced apart to form recesses 38 and 39, respectively, of uniform longitudinal dimensions equal to the longitudinal dimension of each of the fins 36 and 37. Moreover, the second fins 37 are longitudinally staggered relative to the first fins 36 so that a fin 37 is in lateral alignment with a first recess 38, while each first fin 36 is in lateral alignment with a corresponding second recess 39.

As best disclosed in FIGS. 3 and 6, a heating stage is built up by assembly of a plurality of modules 30 longitudinally parallel and adjacent to each other, with the first fins 36 of the second module 30' (FIG. 6) opposite and aligned with a second recess 39 in the first module 30, such that the lateral outer vertical face of the fin 36 closes the recess 39. In a similar manner, the outer vertical face of each fin 37 closes an opposing recess 38. Thus, the closed recesses 38 and 39 form longitudinally staggered vertical holes, each hole having a rectangular cross-section, completely enclosed laterally and longitudinally, but vertically open to provide a fluid passage for the molten thermoplastic material 24.

Each module body 34 is heated by a plurality of heating elements 40, such as cartridges or calrod elements received in heating element holes 41 formed in the core 34.

One or more of the modules 30, 30' may be provided with a well 42 in its core 34 for receiving a thermal sensing element 43. The heating elements 40 may be connected by electrical leads or wires 44 through an electrical conduit 45 to a heater control device 46.

In order to provide space for the heater wires 44, the upper portion of the core 34 may be relieved to form a chamber 47, the upper portion of which may be closed by a cap 48, secured by screws 49.

Each group of parallel modules 30 in each stage 31 and 32 may be held in assembled position by the ganging bars 50 at each end of the module 30. The ganging bars 50 may be connected together by the vertical connecting bars 51 and suspended from the upper edge of the hopper 15 by the hanger bars 52. The method of supporting the assembled modules 30 by the hanger bars 52 prevents any fastener members from penetrating the walls of the heater receptacle 14, to eliminate leakage of the very hot molten thermoplastic material 24.

The thermal sensing elements 43 for each heating stage 31 and 32 are connected to separate and independent thermostatic controls, so that the pre-melt stage 31 may be heated to and maintained at a lower temperature than the progressive melt or melting stage 32, as described in the prior U.S. Mercer Pat. No. 3,531,023.

In the preferred form of the invention, each longitudinal body 34 is made of a monolithic, thermally conductive material, including the core 34 and the fins 36 and 37.

The module construction 30 and 30' provides substantial exterior heat transfer surface by virtue of a plurality of longitudinally spaced vertical fins 36 and 37 projecting from opposite sides of the core 34.

The function and operation of the apparatus 10 is substantially the same as that of the apparatus described in the prior Mercer U.S. Pat. No. 3,531,023.

By perfabricating a plurality of the uniformly constructed modules 30 and 30', thermoplastic melting devices and apparatus may be easily and very quickly and economically assembled, regardless of the number of vertical stages required, and regardless of the transverse size and capacity of the apparatus desired.

It has been found in the actual operation of an apparatus 10 incorporating only a pre-melt stage assembled from the modules 30 that the capacity of the molten thermoplastic material flow was dramatically increased from 300 pounds an hour to from 800 to 1200 pounds an hour.

The top walls 56 and 57 of the respective fins 36 and 37 are sloped, so that they decline laterally from the core 34 to facilitate drainage of the molten thermoplastic material 24 downward into the corresponding vertical holes 38 and 39, to prevent unwanted accumulation of the thermoplastic material on top of the modules 30 and 30'.

It is also within the scope of this invention to provide horizontal holes in the core 34 to receive heating elements, such as heating elements 40, longitudinally horizontally within the core 34.

The monolithic thermally conductive material incorporated in each of the modules may be of an aluminum alloy, such as aluminum alloy U.S. Pat. No. 202,413 or aluminum alloy 6061T6.

It has been found that a pre-melt stage 31 or progressive melting stage 32 has been designed which affords a greater ratio of heating surface to the opening areas for the thermoplastic material, thereby reducing the melting time and increasing the flow velocity of the thermoplastic material 24 through the respective melting stages 31 and 32, respectively.

What is claimed is:

1. A heater module assembly adapted to be used in an apparatus for melting and dispensing thermoplastic material, comprising:
   (a) at least first and second heater modules,
   (b) each of said heater modules comprising an elongated body of thermally conductive material including an elongated core having longitudinal, transverse, and vertical dimensions, and first and second sides,
   (c) each of said bodies including longitudinally spaced, vertically disposed, first fins projecting laterally from the first side of each of said corresponding cores, each first fin having exposed heat transfer surfaces and defining a substantially vertical first recess between each pair of adjacent first fins,
   (d) each of said bodies further including longitudinally spaced, vertically disposed, second fins projecting laterally from the second side of each of said cores, each second fin having exposed heat transfer surfaces and defining a substantially vertical second recess between each pair of adjacent second fins,
   (e) said first and second heater modules being arranged so that said corresponding elongated bodies are substantially parallel and adjacent to each other,
   (f) each first fin of said first body spanning a second recess of said second body, and each second fin of said second body spanning a first recess of said first body, so that each of said first recesses on said first body and each of said second recesses on said second body are closed by opposing corresponding fins to form longitudinally staggered substantially vertical holes through which thermoplastic material is adapted to flow,
   (g) each of said first fins on said first body having substantially the same longitudinal dimension as a corresponding second recess on said second body and each of said second fins on said second body having substantially the same longitudinal dimension as a corresponding first recess on said first body, and
   (h) heating means within said bodies for heating the exposed heat transfer surfaces of said first and second fins.

2. The invention according to claim 1 in which each of said first and second fins and each of said first and second recesses have uniform rectangular cross-sections.

3. The invention according to claim 1 in which said heater module assembly is mounted within a hoppertype housing whose cross-section is substantially the same as, but slightly larger than, the cross-section of said assembly to provide a space between at least one wall of said hopper-type housing and the adjacent vertical surface of said assembly to permit vertical flow of the thermoplastic material between said assembly and said wall of said housing, and means at the bottom of said hopper-type housing for discharging the melted thermoplastic material.

4. The invention according to claim 3 in which said heater module assembly constitutes an upper, pre-melting stage, and further comprising a second heater module assembly constituting a lower melting stage below said upper stage.

5. The invention according to claim 4 in which the holes in said upper stage are substantially vertically aligned with the holes in said lower stage.

6. The invention according to claim 1 in which each of said first and second fins have top walls which decline laterally away from the cores of said corresponding first and second bodies.

* * * * *